United States Patent

Baggett

[15] 3,655,506
[45] Apr. 11, 1972

[54] WATER-SOLUBLE POLYALKANOLAMINE RESINS

[72] Inventor: Joseph M. Baggett, Freeport, Tex.
[73] Assignee: The Dow Chemical Company, Midland, Mich.
[22] Filed: Sept. 17, 1970
[21] Appl. No.: 73,236

Related U.S. Application Data

[63] Continuation-in-part of Ser. No. 873,118, Oct. 31, 1969.

[52] U.S. Cl. .................. 162/164, 260/2 BP, 260/29.2 EP
[51] Int. Cl. ......................................................... D21d 3/00
[58] Field of Search .................. 260/2 BP, 29.2 EP; 162/164

[56] References Cited

UNITED STATES PATENTS 2,573,957  11/1951  Daniel et al. ............................ 117/76
2,595,935  5/1952  Daniel et al. ............................ 92/3
2,753,372  7/1956  Lundberg ............................ 260/501
2,849,411  8/1958  Lehmann et al. ...................... 260/29.2
3,174,928  3/1965  Kekish .................................. 210/54
3,577,313  5/1971  Bolger ................................. 162/164

Primary Examiner—William H. Short
Assistant Examiner—E. Nielsen
Attorney—Griswold and Burdick, D. H. Thurston and C. E. Rehberg

[57] ABSTRACT

Water-soluble thermosetting cationic resins having advantageous properties are prepared by a two-step process wherein a relatively small excess of epichlorohydrin is first reacted with aqueous ammonia, an ammonia-polyamine mixture, or a polyamine to form an intermediate resin solution and additional epichlorohydrin is then reacted with that solution. The resin is useful as an additive to paper pulp to provide enhanced wet strength in the finished paper.

16 Claims, No Drawings

WATER-SOLUBLE POLYALKANOLAMINE RESINS

CROSS-REFERENCE TO RELATED APPLICATION

This application is a continuation-in-part of my copending application, Ser. No. 873,118 filed Oct. 31, 1969.

BACKGROUND OF THE INVENTION

The present invention relates to a new process for making epichlorohydrin-ammonia and epichlorohydrin-polyamine resins and to the new resinous compositions thereby obtained. The reaction of ammonia or a polyamine with epichlorohydrin to produce resins has previously been accomplished by a procedure wherein the two reactants have been combined and reacted in a single reaction step. Insoluble, cross-linked resins useful as ion exchange resins have been made by such processes using either an aqueous or an anhydrous organic reaction medium. Similarly, water-soluble resins have been made by reacting epichlorohydrin with aqueous ammonia or polyamine in various proportions. These resins have been used as binders in textile printing pastes, as surfactants, and as agents for treating textile fibers or plastic films to promote adhesion of dyes or plastic topcoats. Such resins also provide additional wet strength to paper when added to the paper pulp at an appropriate stage.

SUMMARY OF THE INVENTION

It has been discovered that thermosetting cationic water-soluble resins giving markedly increased wet strength to paper are obtained by a process differing from the above-described known art in that the epichlorohydrin reactant is reacted with aqueous ammonia, a polyamine, or mixture thereof in two separate stages under particular conditions and in proportions as specified. In brief, this new process comprises the steps of:

a. forming an intermediate resin or prepolymer solution by reacting about 0.3 to 0.7 mole of epichlorohydrin with one atom of reactable amine hydrogen contained in ammonia, an aliphatic polyamine having at least two amine hydrogens per molecule, or mixture thereof in aqueous solution and maintaining the reaction mixture thereby obtained at 0°–100° C. until essentially no unreacted epichlorohydrin remains, and b. reacting the intermediate resin solution thereby formed with about 0.5–1.7 parts by weight of additional epichlorohydrin per part of resin solids in the prepolymer solution at 40°–100° C. Preferably, the reaction mixture is heated until essentially no unreacted epichlorohydrin remains.

The polyisopropanolamine or N-substituted polyisopropanolamine resin thereby produced differs in some way not fully understood from the product of the prior art one step procedure so that this new resin is substantially superior as a paper additive to increase wet strength. Wet burst strengths about two or three times those found with paper containing known epichlorohydrin-ammonia and epichlorohydrin-polyamine resins are thereby provided.

DETAILED DESCRIPTION

Aliphatic polyamines containing at least two and preferably three or four reactable amine hydrogen atoms per molecule are applicable as nitrogen base reactants in the process, either as such, in admixture with other such amines or in admixture with ammonia. The term aliphatic polyamine is used herein to mean compounds having two or more amino groups and includes alkylenediamines, higher polyalkylenepolyamines, cycloalkanediamines, and also nonaromatic heterocyclic polyamines having the defined number of amino hydrogen atoms. Polyalkylenepolyamines, and particularly alkylenediamines, of two-10 carbon atoms are preferred amine reactants, for example, ethylenediamine, propylene diamine, 1,4-butanediamine, diethylenetriamine, N-methylethylenediamine, 1,6-hexanediamine, and triethylenetetramine. Other types of polyamines are also operable such as diaminocyclohexane, 1,3-diamino-2-propanol, piperazine, N-(2-aminoethyl)piperazine, and the reaction product of ethylenediamine and the diglycidyl ether of Bisphenol A. A preferred alkylenediamine such as ethylenediamine or a mixture of ethylenediamine and diethylenetriamine, for example, is also advantageously used in example, is also advantageously used in combination with ammonia as the nitrogen base reactant in this process.

While the minimum difunctionality of the nitrogen base reactant is essential to operability of the present invention, i.e., so that the product is thermosettable, a small proportion of a monoamine can be employed as a chain extender and modifier. Thus, up to about 10 mole percent of the nitrogen base can be an amine such as ethanolamine, butylamine, and octylamine.

The first step of the new process is preferably carried out by adding the initial 0.3–0.7 mole, preferably 0.4–0.5 mole, of epichlorohydrin with one equivalent of reactable amine hydrogen as contained in ammonia, polyamine, or mixture thereof in about 20–30 percent aqueous solution at 0°–40° C. and maintaining that temperature until the reaction exotherm has substantially ceased. This normally requires from 1 to 10 hours, depending upon the volumes of reactants employed. Other concentrations of aqueous ammonia or polyamine can be used in the initial process step, for example, any concentration in the range of 10–40 percent. The reaction mixture is then suitably digested, preferably with at least occasional stirring, in the same temperature range for an additional 1–30 hours, then heated an additional 0.2–5 hours at 50°–100° C. The progress of the reaction in this first process step is conveniently followed by determination of the water-soluble inorganic chloride present, for example, by titration with silver nitrate in the standard Volhard method. Best results are obtained by running this process step until the ionizable chloride concentration approaches a maximum value without gellation occurring. This maximum signifies the point at which essentially all of the epichlorohydrin has reacted. The prepolymer solution may be adjusted by dilution with water to a solids content of 20–75 percent by weight in this finishing heating step for more convenient operation.

When using the lower amounts of epichlorohydrin, i.e. 0.3 to 0.4 mole per amine hydrogen equivalent, and the ionic chloride content is above 13.5 percent, it becomes necessary in order to prevent gelling to dilute the resin mixture to 20–25 percent solids content and optionally shear it in the final digestion stage in the first step of the process.

In the second reaction step, the prepolymer or intermediate resin solution is preferably reacted with about an equal weight based on resin solids of additional epichlorohydrin, for example, about 0.75–1.25 parts of epichlorohydrin per part of resin. This reaction step is carried out at about 40°–100° C., preferably at 50°–80° C., for a reaction time of 0.2–5 hours preferably so as to react essentially all of the added epichlorohydrin.

In this second step, when using the prepolymer having the high ionic chloride content, it is necessary both to dilute as above and shear the reaction mixture in order to prevent gelling. The dilution and shearing operations are illustrated in Examples 18 and 19 of the following specification.

A by-product in both steps of the described process is 1,3-dichloro-2-propanol or glycerol dichlorohydrin. This compound, being soluble in water, remains dissolved in the resin solution product of each step. It is ordinarily of no advantage to remove it from the intermediate resin solution, but it is usually desirable to separate this by-product from the final resin solution before using that resin solution as a paper pulp additive. Any conventional means of separation such as solvent extraction or distillation can be used. A convenient separation is accomplished by distilling off the glycerol dichlorohydrin as its azeotrope with water under reduced pressure. Any remaining unreacted epichlorohydrin can be removed in the same way.

More than the defined maximum 1.7 parts by weight of epichlorohydrin can be added to the prepolymer solution in the second process step, but such excess reactant is unnecessary and merely represents that much more by-product or unreacted material which may have to be removed from the final resin solution.

The epichlorohydrin-nitrogen base resin product of this new process is readily absorbed by cellulosic fibers. It is preferably added to a paper pulp slurry at the beater, stock chest, head box, or other point which permits adequate mixing prior to formation of the paper sheet. The paper pulp may be any conventional pulp including chemically and mechanically produced wood pulp, rag pulp, and similar cellulosic fibers. The amount of additive depends upon the specific pulp and the wet strength desired. Useful wet strength improvement is obtained with 0.1–5 weight percent of resin solids based on the paper pulp, dry basis. Optimum performance is generally obtained with a loading of 0.2–1 percent. After treating the pulp with the aqueous resin solution, the usual paper drying cycle at 50°–150° C. converts the resin into a cross-linked insoluble solid which imparts considerable wet strength to the treated paper. The most preferred resins for this use are those made by reacting epichlorohydrin with ammonia or a mixture of ammonia with a small amount of a polyamine such as ethylenediamine. The polyamine component can also be mixed amines such as a mixture of ethylenediamine and diethylenetriamine or ethylenediamine plus propylenediamine, for example.

EXAMPLE 1

A 5-liter reaction flask equipped with reflux condenser, stirrer, thermometer, and feeding funnel was charged with 431 g. (7 g. moles) of 28–30 percent aqueous ammonia and partially immersed in a cooling bath. With the reaction mixture temperature maintained at 16°–20° C., 925 g. (10 g. moles) of epichlorohydrin was added over a period of 4 hours. At the end of the addition, the reaction mixture was stirred for another 16 hours at the same temperature, then 330 g. of water was added and the mixture was heated to 100° C. and cooled to room temperature over a 2-hour period. The resulting resin solution was a clear yellowish syrup containing 62–63 percent solids and 11.75 percent ionizable chloride content. The ratio of reactants may also be expressed as 0.477 moles of epichlorohydrin per atom of amine hydrogen equivalent.

Resin from the above experiment and resins produced in the examples which follow were tested as wet strength paper additives by the following procedure:

Unbleached Kraft pulp was beaten to a Canadian Standard Freeness (TAPPI Method T227M-58) of 500 ml. in a Nobel and Wood beater. The pulp was diluted to 0.25 percent solids and the pH adjusted as required with either hydrochloric acid or caustic. The desired amount of resin was blended with the test pulp slurry for 1 minute and then sheets were formed on a British hand sheet machine (TAPPI Method T205M-58). The test sheets were dried at 130° C. for 30 sec. and then cured for 1 hour at 105° C. After conditioning at room temperature, the test sheets were soaked in water for two hours before measuring the burst strength by TAPPI Method T403M-58.

The following wet burst strength data were obtained using the resin product of the foregoing example:

| Resin Loading lbs./ton of pulp | Strength lbs./sq. in. |
| --- | --- |
| 5 | 3.8 |
| 10 | 5.7 |
| 20 | 11.1 |
| 30 | 13.8 |

A mixture of 200 parts by weight of this prepolymer resin with 100 parts of epichlorohydrin and 200 parts of water was stirred at 95°–98° C. for 2 hours and cooled to room temperature. The by-product 1,3-dichloro-2-propanol was removed as the water azeotrope by vacuum distillation to obtain as the distillation residue a clear, yellowish resin solution containing about 33 percent by weight solids. This resin when added to paper pulp provided paper having the following wet burst strength properties in the above-identified test procedure.

| Resin Loading lbs./ton of pulp | Strength lbs./sq. in. |
| --- | --- |
| 5 | 9.0 |
| 10 | 14.7 |
| 20 | 22.7 |
| 30 | 31.7 |

EXAMPLE 2

A prepolymer resin solution of 62 percent solids content and 10.5 percent ionizable chloride was prepared using essentially the same quantities of reactants and the procedures described in Example 1. A 200 g. portion of this prepolymer solution was stirred at 50° C. while 100 g. of epichlorohydrin was added dropwise over a period of 10 minutes. The temperature of the reaction mixture rose to 55° C. for about 30 minutes, then fell to the 50° C. bath temperature. The mixture was then heated at 75°–80° C. for 1 hour to complete the reaction, during which time the viscosity of the mixture increased markedly and 300 g. of water was added to reduce it. The resulting solution contained about 17 percent by weight of 1,3-dichloro-2-propanol by gas-liquid chromatography and a sample dried at 115° C. indicated about 32 percent solids content.

After removal of the dichloropropanol as before, the resin was tested as a paper additive as described above to obtain the following wet burst strength data:

| Resin Loading lbs./ton of pulp | Strength lbs./sq. in. |
| --- | --- |
| 5 | 11.7 |
| 10 | 18.6 |
| 20 | 26.4 |
| 30 | 34.3 |

EXAMPLE 3

In an alternative procedure, a mixture of 100 parts by weight of the prepolymer of Example 2 with 100 parts of water was stirred while 100 parts of epichlorohydrin was added and the resulting mixture was heated at 96°–99° C. for 2 hours. The product solution was a thin, light yellowish liquid containing 33.9 percent by weight solids. Wet strength tests of paper made containing this resin as described before provided the following results.

| Resin Loading lbs./ton of pulp | Strength lbs./sq. in. |
| --- | --- |
| 5 | 7.2 |
| 10 | 13.3 |
| 15 | 15.4 |
| 20 | 20.6 |
| 30 | 25.4 |

EXAMPLES 4–8

Prepolymers and finished resins were prepared essentially as shown in Example 1 using various ratios of epichlorohydrin to ammonia in the prepolymer preparation. Final heating of the prepolymer solution was continued in each case until the ionizable chloride content had reached a maximum value. In each case also, prepolymer solution of 62 percent solids content and ionizable chloride as shown was reacted with 0.5 part by weight of epichlorohydrin to make the final resin. Wet paper burst strength tests were run as before using 62 percent resin solutions. The numbers in parentheses express the moles of epi used per atom of amine hydrogen equivalent.

| Example No. | Prepolymer mole ratio | | Ionizable [1] chloride | Wet Strength Test | | |
|---|---|---|---|---|---|---|
| | | | | Lbs./ton pulp | Lbs./sq. in. | |
| | Epi. | NH₃ | | | Prepolymer | Final resin |
| Example No.: | | | | | | |
| 4 [2] | 2.0 (0.667) | 1.0 | 9.9 | 10 | 4.4 | 9.7 |
| | | | | 30 | 7.3 | 14.1 |
| 5 | 1.67 (0.557) | 1.0 | 10.5 | 10 | 4.0 | 11.8 |
| | | | | 30 | 5.0 | 17.0 |
| 6 | 1.42 (0.473) | 1.0 | 12.2 | 10 | 3.6 | 15.1 |
| | | | | 30 | 4.3 | 27.1 |
| 7 | 1.25 (0.417) | 1.0 | 13.7 | 10 | 6.4 | 21.2 |
| | | | | 30 | 7.0 | 29.6 |
| 8 | 1.0 (0.333) | 1.0 | (Prepolymer gelled) | | | |

[1] These figures are based on 60% solids.
[2] 1,3-dichloro-2-propanol removed from finished resin by distillation as water azeotrope. In other examples, this was accomplished by extraction with methylene chloride.

EXAMPLES 9–11

With the reaction temperature maintained at 16°–20° C. by a cooling bath, 10 g. moles of epichlorohydrin was added over a 4-hour period to 7 g. moles of ammonia in 28 percent aqueous solution in a reaction flask equipped with stirrer, reflux condenser, thermometer, and dropping funnel. This mole ratio can be expressed as 0.477 moles epichlorohydrin per atom amine hydrogen equivalent. After the addition, the reaction mixture was stirred for another 16 hours at the same temperature, then 330 g. of water was added. The resulting milky contents were heated for 45 minutes at 50°–60° C. to obtain a clear prepolymer solution analyzing 6.2 percent ionizable chloride and 61 percent solids.

A. A portion of this prepolymer solution was diluted with water to 40 percent solids and 100 g. of the diluted solution was heated at 70°–80° C. while 40 g. of epichlorohydrin was added in about 10 minutes. The reaction mixture was stirred at 70°–80° C. for a further 2 hours.

B. A second portion of prepolymer solution was heated for 45 minutes at 65°–70° C. to reach an ionizable chloride value of 9.7 percent. This solution was then diluted to 40 percent solids and a 100 g. quantity was reacted with 40 g. of epichlorohydrin and heated as in (A).

C. A third portion of prepolymer solution was heated for 45 minutes at 65°–70° C. and then for 55 minutes at 90°–95° C. At this point, the ionizable chloride content had about levelled off at 10.7 percent. This sample was diluted to 40 percent solids and 100 g. of the diluted solution was reacted with 40 g. of epichlorohydrin and heated as in (A).

Finished resins from (A), (B), and (C) were tested as wet strength paper additives by the methods previously described. Wet burst strength data at various resin loadings are listed in the following table.

| Resin Loading lbs./ton of pulp | Wet Burst Strength, lbs./sq. in. | | |
|---|---|---|---|
| | A (6.2% Cl⁻) | B (9.7% Cl⁻) | C (10.7% Cl⁻) |
| 5 | 7.6 | 9.9 | 12.5 |
| 10 | 11.4 | 14.0 | 18.9 |
| 15 | 14.4 | 17.7 | 25.3 |
| 20 | 17.2 | 20.0 | 28.2 |

Figures for ionizable chloride in (A), (B), and (C) represent 29–51 percent of the total chlorine theoretically present in the prepolymer solution.

EXAMPLE 12

A 10-gallon glass reactor was charged with 5.6 lbs. (0.092 lb. mole) of concentrated NH₄OH and 12.2 lbs. (0.132 lb. mole) of epichlorohydrin was added in 2.5 hours to the stirred mixture while the temperature was held below 32° C. After the epichlorohydrin had been added, the solution was heated to 60° C. and held at that temperature for 1 hour. At this point, a sample diluted to 62 percent solids content analyzed 11.6 percent ionizable chloride, corresponding to 55 percent of the total chlorine theoretically present. The reaction mixture was diluted with 16.7 lbs. of water, heated back to 60° C., and 11.1 lbs. (0.12 lb. mole) of epichlorohydrin was added rapidly with stirring. After heating the final reaction solution for another 2 hours at 60° C., the resin was tested as a paper additive as before with the following results:

| Resin Loading lbs./ton of pulp | Wet Burst Strength lbs./sq. in |
|---|---|
| 5 | 20.4 |
| 10 | 30.2 |
| 15 | 32.1 |
| 20 | 32.5 |

EXAMPLE 13

This example illustrates the characteristic results obtained by using the known one-step process for making an ammonia-epichlorohydrin resin.

A reaction flask containing a mixture of 425 g. (7.0 moles) of 28 percent aqueous ammonia and 330 g. of water was cooled to about 10° C. in a cooling bath and 1,765 g. (19.1 moles) of epichlorohydrin was added at 1–2 ml./min. with stirring at a reaction temperature of 10°–22° C. After the addition was complete, the reaction mixture was stirred for 18 hours at about room temperature, then it was heated at 75°–85° C. for an hour, cooled, and diluted with 2520 g. of water. The product was a thin, light yellow solution containing 34 percent by weight of solids, about 11.5 percent of 1,3-dichloro-2-propanol, and no detectable unreacted epichlorohydrin. The dichloropropanol was stripped off under vacuum distillation to produce a finished resin solution. This was tested by the methods previously described as a paper pulp additive to improve wet strength of the finished paper. Results were as shown in the following table.

| Resin Loading lbs./ton of pulp | Strength lbs./sq. in. |
|---|---|
| 5 | 6.0 |
| 10 | 7.5 |
| 20 | 11.1 |
| 30 | 13.1 |

The preceding example shows that the resulting ammonia-epichlorohydrin resin produced by the prior art method is inferior to the corresponding resin of the present invention with respect to wet strength properties.

EXAMPLE 14

A series of epichlorohydrin-amine resins were prepared by the following general procedure. A reactor flask such as described in Example 1 was loaded with an amine or amine combination having approximately 20 gram atoms of amine hydrogen plus sufficient water to make about a 28 weight percent solution. This was cooled by immersion of the flask in a cold water bath and 10 gram moles of epichlorohydrin was added at about 1–2 grams per minute to maintain a reaction temperature of 20°–30° C. The reaction mixture was allowed to digest at 20°–25° C. for 16 hours to assure complete reaction, then the mixture was heated slowly to 95° C. and allowed to remain at this temperature for 1 hour. The product was the so-called prepolymer stage.

The prepolymer solution was diluted with water to 40 percent solids content and a 150 g. sample was reacted at 60°–70° C. with 60 g. of epichlorohydrin and the product was digested at 70°–75° C. for 2 hours. The reaction product was then extracted with about an equal volume of methylene chloride to remove the dichloropropanol by-product of the last reaction. The extracted sample was stripped of solvent at 30° C. under reduced pressure to obtain the finished resin.

By the above procedure, 10 g. moles of epichlorohydrin was reacted with a solution of 315 g. of ethylenediamine (21 gram atoms of amine hydrogen) in 810 g. of water. The resulting prepolymer solution was amber in color, 63 percent solids, viscosity 275 cps. at 25° C. It was tested as a wet strength additive for paper by the method described in Example 1 with the results listed below.

| Resin Loading lbs./ton of pulp | Wet Burst Strength lbs./sq. in. |
|---|---|
| 5 | 11.2 |
| 10 | 16.5 |
| 15 | 19.1 |
| 20 | 20.4 |

A sample of 100 g. of the above prepolymer solution was stirred at 50° C. while 63 g. of epichlorohydrin was added and the reaction mixture was allowed to digest for 2.5 hrs. at 50° C. The product was diluted to 40 percent solids content, extracted with methylene chloride, separated and stripped of solvent under reduced pressure. This resin was tested as above as a wet strength paper additive with results as shown.

| Resin Loading lbs./ton of Pulp | Wet Burst Strength lbs./sq. in. |
|---|---|
| 5 | 16.6 |
| 10 | 24.0 |
| 15 | 24.8 |
| 20 | 30.0 |

EXAMPLE 15

Using the procedure of Example 14, 433 g. of diethylenetriamine (21 gram atoms of amine hydrogen) in 1,123 g. of water was reacted with 925 g. of epichlorohydrin to obtain a 55 percent solids prepolymer solution having a viscosity of 1,325 cps. at 25° C. When tested as a paper pulp additive as before, the following results were obtained.

| Resin Loading lbs./ton of pulp | Wet Burst Strength lbs./sq. in. |
|---|---|
| 5 | 11.6 |
| 10 | 18.2 |
| 15 | 16.5 |
| 20 | 20.2 |

A sample of 50 g. of the above prepolymer solution was dissolved in 148 g. of water and reacted with 28.6 g. of epichlorohydrin at 50° C. for 1.75 hrs., then the mixture was heated slowly to 85° C. and digested for 1.5 hrs. at that temperature. Wet strength paper test results were as follows:

| Resin Loading lbs./ton of pulp | Wet Burst Strength lbs./sq. in. |
|---|---|
| 5 | 15.3 |
| 10 | 19.3 |
| 15 | 23.2 |
| 20 | 24.5 |

EXAMPLE 16

By the general procedure outlined in Example 14, 10 g. moles of epichlorohydrin was reacted with 578.3 g. of mixed amine (22 gram atoms of amine hydrogen) dissolved in 1504 g. of water. The mixed amine was the reaction mixture obtained by adding 80 g. of the diglycidyl ether of Bisphenol A to 120 g. ethylenediamine at 35° C. and digesting the mixture for 4 hours at 35° C. The mixture consisted essentially of the product of addition of two moles of diamine to one mole of diepoxide plus excess ethylenediamine. The resulting amber prepolymer solution contained 50.5 percent solids and 9.25 percent ionic chloride and had a viscosity of 690 centipoises at 25° C. As an additive to paper pulp, it showed the following properties:

| Resin Loading lbs./ton of pulp | Wet Burst Strength lbs./sq. in. |
|---|---|
| 5 | 11.0 |
| 10 | 15.2 |
| 15 | 19.4 |
| 20 | 16.9 |

The prepolymer was diluted to 40 percent solids content and 150 g. of the diluted solution was reacted with 60 g. of epichlorohydrin at 55°–66° C. for about 2 hours. The product was extracted with methylene chloride and stripped of solvent as before. Wet strength paper tests carried out with this product are listed below.

| Resin Loading lbs./ton of pulp | Wet Burst Strength lbs./sq. in. |
|---|---|
| 5 | 15.6 |
| 10 | 19.5 |
| 15 | 23.4 |
| 20 | 28.5 |

EXAMPLE 17

Using the procedure of Example 14, a mixture of 348 g. of 1,6-hexanediamine and 122.1 g. of 28 percent aqueous ammonia (a total of 18 gram atoms of amine hydrogen) in 348 g. of water was reacted with 925 g. of epichlorohydrin at 18°–24° C., the latter reagent being added at about 1.5–1.8 grams per minute. The mixture was then allowed to digest for 16 hours at 25° C., after which it was heated to 80° C. and maintained at that temperature for 2 hours. The resulting amber prepolymer solution contained 52.6 percent solids and had a viscosity of 54 cps. at 25° C. Ionic chloride content based on 62 percent solids content was 11.6 percent. Wet burst strength tests of paper made from pulp containing the prepolymer as an additive showed the following:

| Resin Loading lbs./ton of pulp | Wet Burst Strength lbs./sq. in. |
|---|---|
| 5 | 19.8 |
| 10 | 29.1 |
| 15 | 26.4 |
| 20 | 26.2 |

A finished resin was made from the above prepolymer by diluting 118 g. of the prepolymer solution with 37 g. of water and adding 50 g. of epichlorohydrin at 70° C. over a period of 30 minutes. The reaction mixture was then stirred for 1.5 hrs. at that temperature to produce a resin solution containing 45.5 percent solids. Testing of this product in paper pulp after washing with methylene chloride to remove the by-product dichloroisopropanol and vacuum stripping as before provided the following results.

| Resin Loading lbs./ton of pulp | Wet Burst Strength lbs./sq. in. |
|---|---|
| 5 | 28.9 |
| 10 | 35.7 |
| 15 | 38.8 |
| 20 | 34.5 |

EXAMPLE 18

To a stirring type reactor fitted with reflux condenser, thermometer, and feeding funnel was added 202.2 g. 28% NH$_4$OH (10 gram atoms of amine hydrogen). The reactor was placed in a 10° C. water bath, then the contents of the reactor was stirred until the NH$_4$OH temperature dropped to 15° C. at which point 277.5 g. of epichlorohydrin was fed in at a rate of 1.5 g./min. After the epi had been fed in, the contents were allowed to digest for 16 hrs. with stirring at 20° C. The reactants were then diluted to 50 percent solids by adding 188 g. water and heated to 60° C. for 1 hr. at which point the prepolymer was diluted to 30 percent by adding 442 g. water, placed in a Waring blender (Model 1120) and further heated to 95° C. for about 40 minutes while stirring and then cooled. The prepolymer calculated on 60 percent solids basis had an ionic chloride content of 16.2 percent. Results of testing this product are given in the first table following this example.

100 g. of the above prepolymer diluted to 20 percent solids was placed in the Waring Blender, heated to 50° C., and with fast agitation 21 g. of epichlorohydrin was added dropwise over a period of about 30 min., then with continuous agitation the contents was heated to, and maintained at, 60° C. for 1 ½ hours. The mixture was cooled and extracted with methylene chloride to remove the 1,3-dichloropropanol-2. Residual methylene chloride was removed by vacuum stripping and the product was evaluated as a wet strength resin. Results of this test are given in the second table following this example.

Prepolymer (16.2% ionic chloride)

| Resin Loading lbs./ton of pulp | Wet Burst Strength lbs./sq. in. |
|---|---|
| 5 | 8.6 |
| 10 | 15.4 |
| 15 | 19.4 |
| 20 | 21.5 |

The prepolymer above was reacted with epichlorohydrin using 1 g. epichlorohydrin per gram of solid.

| Resin Loading lbs./ton of pulp | Wet Burst Strength lbs./sq. in. |
|---|---|
| 5 | 13.0 |
| 10 | 23.5 |
| 15 | 32.8 |
| 20 | 31.9 |

EXAMPLE 19

To a stirring type reactor fitted with reflux condenser, thermometer, and feeding funnel was added 202.2 g. 28% NH$_4$OH (10 gram atoms of amine hydrogen). The reaction flask was submerged in a 10°-15° C. bath then 277.5 g. of epichlorohydrin was fed in at a rate of 1.2 g./min. The reaction temperature was controlled between 20°-23° C. After the epichlorohydrin addition the reactants were allowed to digest for 16 hours at 20°-24° C. At this point, the contents were diluted to a 50 percent solution by adding 190 g. of dist. H$_2$O then heated to 60° C. for 1 hr. Then the contents were further diluted to 25 percent solids content by adding 660 g. of dist. H$_2$O and heated to 102° C. for 50 minutes. This prepolymer analyzed 25 percent solids by drying a sample in an air oven at 120° C. This resin solution was a clear, slightly yellow solution having thermosetting properties when dried at 120° C. The ionic chloride based on a 60 percent solids solution analyzed 16% Cl.

The resin was screened as a wet paper additive giving the following data:

| Resin Loading lbs./ton of pulp | Wet Burst Strength lbs./sq. in. |
|---|---|
| 5 | 10.8 |
| 10 | 17.4 |
| 15 | 20.2 |
| 20 | 20.4 |

To a stirring type reactor fitted with reflux condenser, thermometer, and feeding funnel was added 200 g. of the above 25 percent solids prepolymer. The contents were heated over a water bath to 50° C. at which point epichlorohydrin was fed in at a rate of 1.3 g./min. until 70 g. of epi had been fed in. The reactants were allowed to digest for 1 hour at 55° C. The reactants gelled.

The above procedure was repeated using shearing type agitation. Thus, to a Waring blender was added 200 g. of the above 25 percent prepolymer. With fast agitation 70 g. of epichlorohydrin were added dropwise in 20 min. The contents were heated to 75° C. for 1 hr. and 40 min. with fast agitation. The contents were cooled, and by means of a separatory funnel the resin solution was washed with equal portions of methylene chloride to remove the 1,3-dichloropropanol-2. The water layer of resin solution was vacuum stripped of methylene chloride. The resin solution was checked for wet strength properties, giving the following results:

| Resin Loading lbs./ton of pulp | Wet Burst Strength lbs./sq. in. |
|---|---|
| 5 | 12.9 |
| 10 | 22.0 |
| 15 | 24.5 |
| 20 | 29.4 |

EXAMPLE 20

To a 10-gallon Pfaudler glass lined kettle, equipped with stirrer, feed tube, and necessary temperature recorder and controls, was added 11.2 lbs. of 28 percent ammonium hydroxide. With cooling water on the kettle jacket, epichlorohydrin was metered in at the rate (about 0.147 lbs/min) needed to maintain a reaction temperature of 29°-33° C. until 24.4 lbs. of epichlorohydrin had been added. The pressure of the kettle during the epichlorohydrin addition varied from 8 psig at the start of the feed to 2.5 psig at the end of the addition. The solution was diluted to approximately 60 percent solids by adding 8.72 lbs. of water. The solution was immediately heated to 90° C. which required a heating period of about 50 minutes. At this stage the water soluble resin is the so-called prepolymer. The reactants were cooled to 30° C. at which point a sample was taken which analyzed 61.5 percent solids and 11.8 percent ionic chloride. This prepolymer gave the following wet strength properties to paper:

| Resin Loading lbs. resin/ton paper pulp | Wet Burst Strength lbs./sq. in. |
|---|---|
| 5 | 9.4 |
| 10 | 16.8 |
| 15 | 19.4 |
| 20 | 21.6 |

Epichlorohydrin was then fed into the above prepolymer solution at a rate of 0.147 lbs./min., maintaining a reaction temperature of 35° to 40° C., until 22.2 lbs. had been added, at which point the contents were heated to 86° C. requiring a heating period of 1 hr. and 20 minutes. The the solution of the finished thermosetting wet strength resin was cooled to room temperature.

A sample of this resin was diluted to about 40 percent solid, then extracted with an equal weight of methylene chloride by means of a separatory funnel to remove the 1,3-dichloro-2-propanol. The resin solution was stripped of residual methylene chloride by using slight heat (30° C.) and vacuum; then this finished resin was checked for wet strength properties giving the following data:

| Resin Loading lbs. resin/ton paper pulp | Wet Burst Strength lbs./sq. in. |
|---|---|
| 5 | 13.1 |
| 10 | 26.1 |
| 15 | 34.8 |
| 20 | 36.0 |

Examples 12 and 20 above both illustrate the use of pressure in conducting the reaction which are representative of production-type runs made in the plant. The use of pressure is advantageous when ammonia is a reactant and allows temperatures up to 40° C. to be used during the addition of epichlorohydrin in the first step.

I claim:

1. A process for making a thermosetting cationic water-soluble resin which comprises the steps of:
   a. forming an intermediate resin solution by reacting about 0.3 to about 0.7 mole of epichlorohydrin with one atom equivalent of amine hydrogen contained in ammonia, an aliphatic polyamine having at least two amine hydrogens per molecule, or a mixture thereof in aqueous solution and maintaining the prepolymer reaction mixture thereby obtained at about 0°-100° C. until essentially no un-reacted epichlorohydrin remains, and
   b. reacting the intermediate resin solution thereby formed with about 0.5-1.7 parts of additional epichlorohydrin based on the weight of resin in the intermediate resin solution at about 40°-100° C.

2. The process of claim 1 wherein the intermediate resin solution is formed by maintaining the prepolymer reaction mixture at 0°-40° C. until the reaction exotherm has substantially ceased, digesting the mixture at said temperature for an additional 1-30 hours, adjusting the resin concentration in the reaction mixture to 20-75 percent by weight, and heating the adjusted solution at 75°-100° C. for 0.1-5 hours.

3. The process of claim 2 wherein the intermediate resin solution is heated until the ionizable chloride concentration approaches a maximum value.

4. The process of claim 2 wherein 0.3 to 0.4 mole of epichlorohydrin per atom equivalent of amine hydrogen is employed, and the concentration of the reaction mixture is adjusted to 20–25 percent solids prior to heating at 75°–100° C. in step (a).

5. The process of claim 4 wherein the reaction mixture is subjected to shearing during the final heating in step (a).

6. The process of claim 4 wherein the reaction mixture of step (b) is subjected to shearing.

7. The process of claim 1 wherein the amine hydrogen is essentially supplied by ammonia.

8. The process of claim 1 wherein the amine hydrogen is essentially supplied by ethylenediamine.

9. The process of claim 1 wherein the amine hydrogen is essentially supplied by a mixture of ammonia and at least one polyalkylenepolyamine of two–10 carbon atoms.

10. The process of claim 9 wherein the polyalkylenepolyamine is an alkylenediamine.

11. The process of claim 10 wherein the diamine is 1,6-diaminohexane.

12. The process of claim 1 wherein the intermediate resin solution is reacted with about an equal weight of epichlorohydrin based on intermediate resin solids.

13. The finished resin product of the process of claim 1.

14. The finished resin product of the process of claim 7.

15. A paper containing about 0.1–5 percent based on dry pulp weight of the resin prepared by the process of claim 1.

16. A paper containing about 0.1–5 percent based on dry pulp weight of the resin prepared by the process of claim 7.

* * * * *